(12) United States Patent
Mulani et al.

(10) Patent No.: US 10,831,656 B2
(45) Date of Patent: Nov. 10, 2020

(54) SYSTEM AND METHOD TO IMPROVE INPUT OUTPUT COMMAND LATENCY BY DYNAMIC SIZE LOGICAL TO PHYSICAL CACHING

(71) Applicant: Western Digital Technologies, Inc., San Jose, CA (US)

(72) Inventors: Jameer Babasaheb Mulani, Bangalore (IN); Anindya Rai, Bangalore (IN); Devanathan Balasundaram, Bangalore (IN)

(73) Assignee: WESTERN DIGITAL TECHNOLOGIES, Inc., San Jose, CA (US)

(*) Notice: Subject to any disclaimer, the term of this patent is extended or adjusted under 35 U.S.C. 154(b) by 113 days.

(21) Appl. No.: 16/157,076

(22) Filed: Oct. 10, 2018

(65) Prior Publication Data
US 2020/0117598 A1    Apr. 16, 2020

(51) Int. Cl.
| | | |
|---|---|---|
| *G06F 13/00* | (2006.01) | |
| *G06F 13/28* | (2006.01) | |
| *G06F 12/0802* | (2016.01) | |
| *G06F 13/16* | (2006.01) | |

(52) U.S. Cl.
CPC ...... *G06F 12/0802* (2013.01); *G06F 13/1668* (2013.01); *G06F 2212/7201* (2013.01); *G06F 2213/0064* (2013.01)

(58) Field of Classification Search
CPC ............ G06F 12/0246; G06F 12/0802; G06F 13/1668; G06F 2212/1016; G06F 2212/7201; G06F 2212/7203; G06F 2213/0064
See application file for complete search history.

(56) References Cited

U.S. PATENT DOCUMENTS

| | | |
|---|---|---|
| 8,756,375 B2 | 6/2014 | Flynn |
| 9,690,694 B2 | 6/2017 | Nellans et al. |
| 9,767,017 B2 | 9/2017 | Talagala et al. |
| 2017/0206170 A1 | 7/2017 | Jacobs et al. |
| 2018/0101477 A1 | 4/2018 | Kan et al. |
| 2019/0114272 A1* | 4/2019 | Dubey ............... G06F 12/1009 |

OTHER PUBLICATIONS

Wei et al. "WAFTL: A Workload Adaptive Flash Translation Layer with Data Partition," 2011 IEEE 27th Symposium on Mass Storage Systems and Technologies (MSST), Denver, CO, 2011, pp. 1-12. doi: 10.1109/MSST.2011.5937217.

* cited by examiner

*Primary Examiner* — Yong J Choe
(74) *Attorney, Agent, or Firm* — Patterson & Sheridan, LLP; Steven H. Versteeg (57) ABSTRACT

A method and apparatus are provided to divide a logical to physical table into multiple parts, one part in a first fast memory and a second part in a second non-volatile memory, wherein an algorithm may be used in the division.

26 Claims, 5 Drawing Sheets

SYSTEM AND METHOD TO IMPROVE INPUT OUTPUT COMMAND LATENCY BY DYNAMIC SIZE LOGICAL TO PHYSICAL CACHING

BACKGROUND OF THE DISCLOSURE

Field of the Disclosure

Embodiments of the present disclosure generally relate to computer operations and processing of data. More specifically, aspects of the disclosure relate to logical to physical tables and even more specifically, caching of logical to physical tables.

Description of the Related Art

Logical to physical tables are tables which map a logical entity (Page/Block Address/Sector Address) to a physical entity (Page/Block address). In conventional computer applications, a logical to physical table is placed in a fast volatile memory. Placement of the table in fast volatile memory is performed because input/output operations may be affected and hence less overhead improves computer performance.

As computers have evolved, the number of pieces of data to be processed increases, therefore the size of the logical to physical table increases. The increasing size of the table necessitates a larger amount of fast volatile memory. Ever increasing amounts of fast volatile memory can drastically increase the cost of a computer or computer apparatus, therefore large amounts of fast volatile memory is considered a problem in current computer designs.

There is a need to provide for large logical to physical tables to aid in computer operations.

There is a further need to provide a computer arrangement that uses minimal overhead in conjunction with logical to physical table usage.

There is a still further need to provide a computer arrangement that uses large logical to physical tables but is economical to manufacture.

SUMMARY OF THE DISCLOSURE

In one embodiment, a method for operating an apparatus is disclosed comprising obtaining a logical to physical table for the apparatus, the logical to physical mapping logical entities to physical entities, analyzing data in the logical to physical table, choosing a parameter to determine a first portion and a second portion of a dynamic logical to physical table, sorting the logical to physical table according to the chosen parameter and apportioning a size of the first portion and the second portion of the dynamic logical to physical table based on the parameter.

In another embodiment, an arrangement for augmenting a logical to physical table is disclosed comprising means for analyzing data in the logical to physical table, means for choosing a parameter to determine a first portion and a second portion of a dynamic logical to physical table, means for sorting the logical to physical table according to the chosen parameter and means for apportioning a size of the first portion and the second portion of the dynamic logical to physical table based on the parameter.

In another embodiment, a method for operating an apparatus is disclosed comprising obtaining a logical to physical table, choosing a parameter to determine a first portion and a second portion of the logical to physical table, apportioning the first portion and the second portion of the logical to physical table based upon the chosen parameter, performing operations based upon the logical to physical table, determining if the performed operations with the logical to physical table include the second portion of the logical to physical table and augmenting the logical to physical table, wherein data in the second portion of the logical to physical table used in operations are placed in the first portion of the logical to physical table.

In another non-limiting embodiment, an arrangement for augmenting a logical to physical table is disclosed comprising means for choosing a parameter to determine a first portion and a second portion of the logical to physical table, means for apportioning the first portion and the second portion of the logical to physical table based upon the chosen parameter, means for performing operations based upon the logical to physical table, means for determining if the performed operations with the logical to physical table include the second portion of the logical to physical table and means for augmenting the logical to physical table, wherein data in the second portion of the logical to physical table used in operations are placed in the first portion of the logical to physical table.

In another non-limiting embodiment, a method for operating a solid state drive is disclosed comprising obtaining a logical to physical table, the logical to physical table tabulating locations of data stored on the solid state drive, choosing a parameter to divide the logical to physical table into at least a first portion and a second portion, dividing the logical to physical table into the first portion and the second portion based upon the chosen parameter and storing the first portion of the logical to physical table in a first memory and the second portion of the logical to physical table in a second memory.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1:
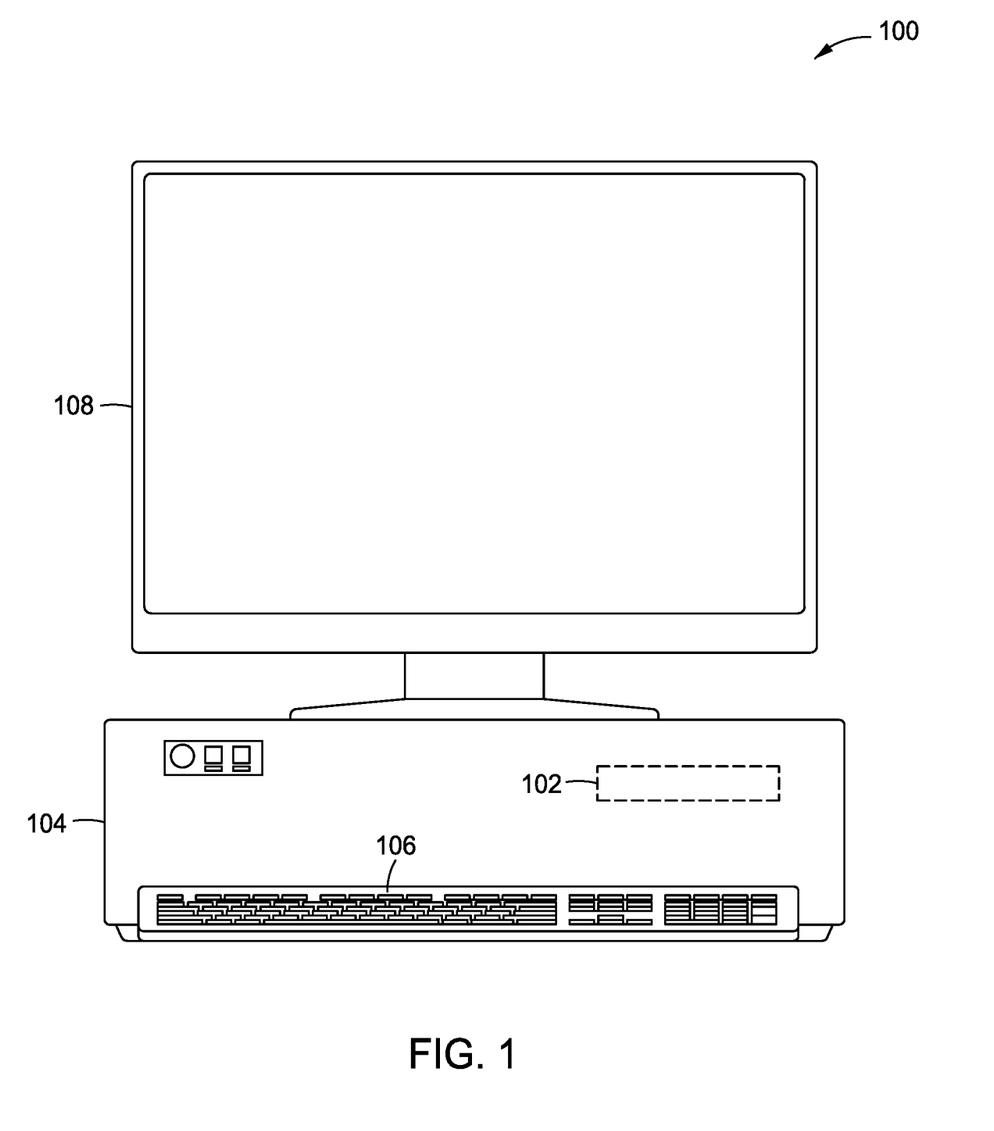
FIG. 1 is a diagram of a computer and associated memory arrangement in one example embodiment of the disclosure.

Aspects of the present disclosure relate to computer operations and computer storage. In the embodiments described, a data storage arrangement is connected to the host system, as represented in FIG. 1. The function of the data storage arrangement is to accept data and store the data until needed again by a user or the host. The data storage arrangement may be configured to accept bursts of data, depending on the computer process performed, therefore the data storage arrangement is configured with multiple memory units that provide for various states of usage. Certain sections of the data storage arrangement are configured with memory systems that provide for fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host. The interface may be a Serial Attached SCSI (SAS) Interface or Serial ATA (SATA) compatible interface, as a non-limiting embodiment. The memory storage may have a configuration to allow for plug and play ability. Although described as having a SAS or SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SAS or SATA compatible, other types of interfaces may be used.

Auxiliary connections may be provided to the data storage arrangement to allow for additional options for inputting data directly to the data storage arrangement without interfacing with the host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, or stereo audio systems. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, the total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured login or an anonymous login capability.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities 1 TB, 2 TB up to 64 TB may be provided, as non-limiting embodiments. Different form factors may also be provided. In the illustrated embodiment, a form factor of 2.5 inches is provided. Other form factors such as 1.8 inch or 3.5 inch may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

Referring to FIG. 1, a host computer 100 is illustrated. The host computer 100 is configured with a memory arrangement 102, such as a solid state drive. The solid state drive 102 is configured to store data that is needed by a user. The use may be immediate or may be years distant, therefore the solid state drive 102 is configured to store the data in a non-volatile manner. Non-volatile storage allows data to be stored within the drive 102 without the drive 102 being connected to a power source. In the illustrated embodiment, the solid state drive 102 may be configured to be removable from the host computer 104. In another embodiment, the solid state drive 102 may be permanently housed within a host computer housing 104. In the solid state drive 102 different types of memory may be used, for example, NAND flash or NOR flash. The host computer 100 may also be configured with an input device 106, such as a keyboard, to allow the user to input data, such as threshold comparison limits, described later, for analysis of data patterns. A monitor 108 may be provided for output of analysis performed by circuitry, such as a second circuit, described later.

In one example embodiment, a logical to physical table is provided in a caching arrangement. In the caching arrangement, part of the logical to physical table is placed in a fast memory (volatile memory) and the remainder of the logical to physical table is placed in a slow memory (NAND flash memory or DDR). Such caching operations will allow, for example, portions of the logical to physical table to be placed in fast memory such that needed operations may be accomplished expeditiously. Data that is less likely to be used in the logical to physical table may be located in a portion of the table that is placed in slow memory.

For definitional purposes, the section of the logical to physical table placed in fast memory (volatile memory) is considered a Level 1 (L1) portion and the logical to physical section in the slow memory (NAND memory) is considered a Level 2 (L2) portion. The portions L1 and L2 do not have to be equal. As L1 and L2 can vary in size, a majority of the logical to physical table can be placed in either fast or slow memory. In one example embodiment, if there is a great need for data from the logical to physical table, and this data is used in a continuous fashion, then the size of the L1 portion may have a significantly larger size than the L2 portion.

During command execution, such as with input and output operations, logical to physical entries need to be accessed to obtain physical locations where data is stored or where it needs to be stored. In a first embodiment, the L1 portion of the logical to physical table is checked for presence of a required logical to physical entry. If the required logical to physical entry is present in the L1 portion, then the required data is retrieved. If the required logical to physical entry is not present in the L1 portion, then a search is conducted in the L2 portion of the logical to physical table. If the search of the L2 portion of the logical to physical table is conducted and the required entry is found, then the required entry may be moved to the L1 portion of the table. Conditions may also be used if a transfer from the L2 to L1 portion is to be accomplished. In one example embodiment, a check may be performed to see if the L1 portion can accept the transfer of data from the L2 portion prior to trying to accomplish such actions. In embodiments, higher probability entries in the L2 portion of the table may be "pre-fetched" and placed in the L1 portion to lessen the possibility of a "miss" in the L1 portion, improving the overall speed of the search.

When using a "slow" memory, a concept of a namespace is used. Namespace is defined as a list of logical block addresses (LBAs) in the slow memory, such as a non-volatile memory. Thus, namespace is a collection of logical blocks in a non-volatile memory. A namespace ID is defined as an identifier that is used to provide access to a specific namespace. This namespace ID may be, for example, used by a controller, to help in finding the specific namespace.

In one example, a single storage device may have multiple namespaces. Such a configuration allows to have a shared logical to physical tables across multiple namespaces or to have a separate logical to physical table for an individual namespace. A namespace ID may be used to decide, thus, which logical to physical table needs to be used for that namespace. In embodiments, the host system may create new namespaces during runtimes by specifying the size the host system requires.

Figure 2:
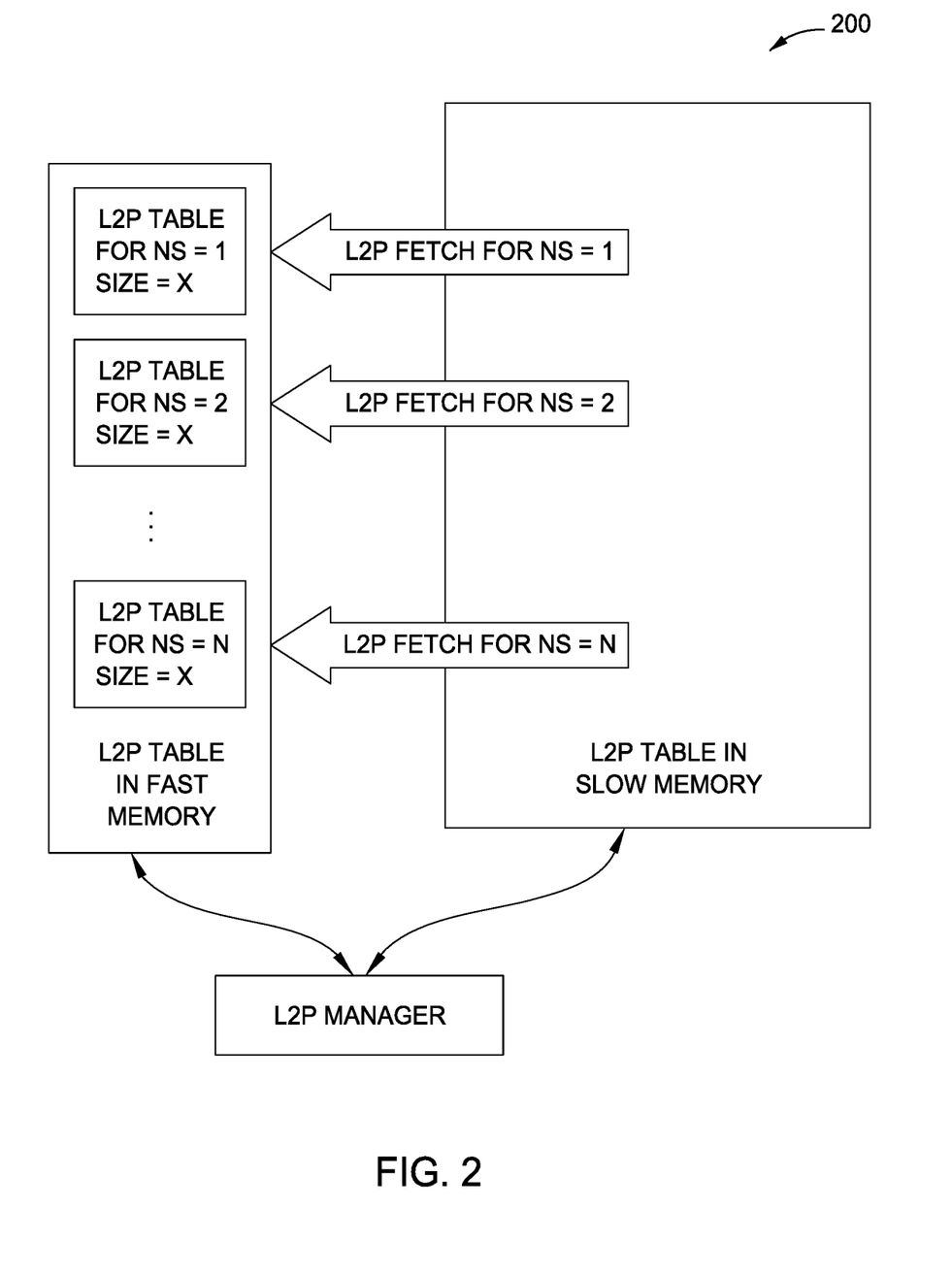
FIG. 2 is a schematic diagram of a caching arrangement using a fast memory, a slow memory and a logical to physical manager.

Referring to FIG. 2, a schematic diagram is provided where a separate logical to physical table is used for an individual namespace. A namespace may include one or multiple logical to physical tables. In other embodiments, the L1 and L2 levels of a logical to physical table may be different of similar namespaces. In FIG. 2, the L1 logical to physical table is used as a cache for logical to physical entries for that namespace.

A static size for the L1 logical to physical table puts a limit on the algorithms which are used to minimize the probability of a L1 table "miss" when a search is performed. Static sizes for L1 portions of logical to physical tables do not consider whether a namespace is active or not, what is workload of that namespace, what is the size of the namespace, etc. During a L1 logical to physical table miss, command execution times vary as there is a need to access the relatively slower L2 of the logical to physical table. This access, therefore impacts command latency. Command latency may also vary according to the type of work load, as L1 logical to physical miss rates might vary based on workloads. For certain users, such as hyperscale users, command latency is an important criterion.

Aspects disclosed provide for having a dynamic size for L1 logical to physical tables per namespace. The criteria used to decide a size of the L1 logical to physical table size may be, as non-limiting embodiments:

The type and amount of input output workload for that namespace

Whether or not the namespace is active or not

The size of the namespace

The amount of power permitted per device

Figure 3:
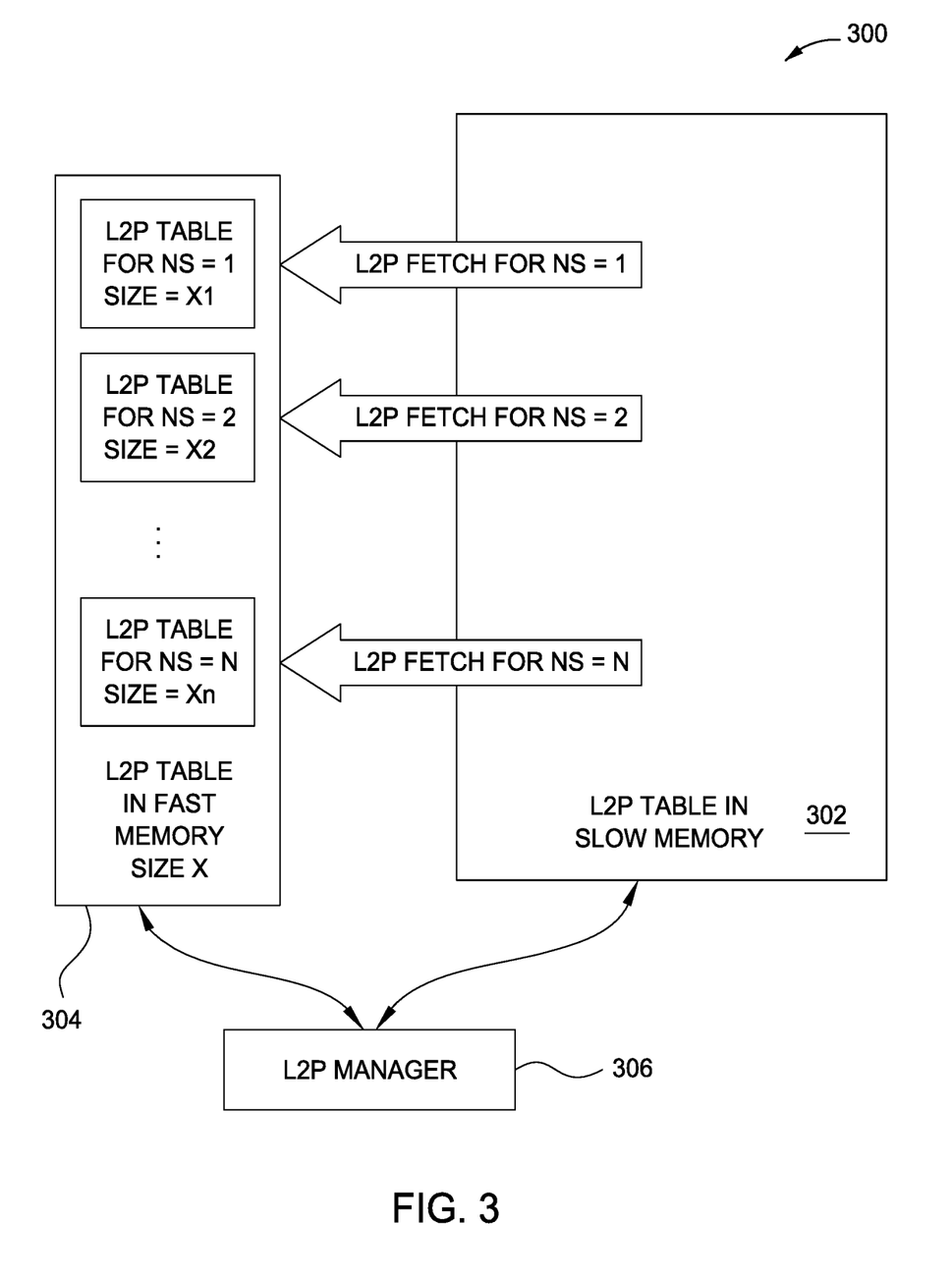
FIG. 3 is a schematic diagram of a caching arrangement using a fast memory, a slow memory and a logical to physical manager.

In one embodiment, the type of amount of input output workload for that namespace is used as a criteria for choosing a dynamic size of the L1 logical to physical table. If the workload is a sequential input output operation and has a higher workload compared to other namespaces then the namespace having a higher workload will be used as the L1 logical to physical table size so that L1 can keep more logical to physical entries hence the probability of L1 miss reduces. As shown in FIG. 3, an algorithm may be used, such as:

Fast memory space reserved for logical to physical table prefetch=X
Size of logical to physical space reserved for NS 1=X1
Size of logical to physical space reserved for NS 2=X2
Size of logical to physical space reserved for NS N=Xn
In embodiments, the value X1 is proportional to the workload for NS 1, X2 is proportional to the workload for NS 2 and Xn is proportional to the workload for NS N $$Xn=X*((\text{workload for }NS1)/\text{workload for }(NS1+NS2+NS N)).$$

In another embodiment, another criteria is used to size the L1 portion of the logical to physical table. The criteria may be whether the namespace is active or not. In an embodiment where the namespace is not active, there is no necessity to keep specific data in the L1 of the logical to physical table in fast memory. Hence, other entries may be stored in the fast memory of active namespaces to reduce latency.

In a still further embodiment, another criterion may be used to size the L1 portion of the logical to physical table. The size of the namespace may be used. As a non-limiting embodiment, a size of a namespace may be used, wherein a namespace having a larger size is used for the L1 logical to physical table. Such use of a larger namespace would reduce the chances of a L1 logical to physical miss.

In another embodiment, the criterion that may be used to size the L1 portion of the logical to physical table may be the amount of power consumption permitted for a device. As a non-limiting example, if work is being performed on a laptop computer that has a limited amount of battery power, choices may be made between different namespaces that would be used by the laptop to complete necessary actions.

If namespace is not active/running low sequential work load/host has asked to reduce power consumption, one can reduce size of L1 L2P table and put unused DDR banks into low power self-refresh mode.

Referring to FIG. 3, an arrangement 300 for a logical to physical table is illustrated. The logical to physical table has an L2 portion that is placed in slow memory 302. The logical to physical memory also has a L1 portion that is placed in fast memory. In the illustrated embodiment, the size of the fast memory is noted as size X, wherein X can be apportioned based upon differing desires or characteristics/parameters. A logical to physical manager 306 is created to allow data to be transferred from the L2 sections of the slow memory 302 to the fast memory section of the logical to physical table 304. As illustrated, logical to physical fetching may be performed for data from the slow memory 302 to the fast memory 304. In the illustrated embodiment, fetching occurs for NS=1, NS=2 through NS=N as provided in 308. According to the value of the namespace, such as NS1, NS=2, NS=N, fetching may vary.

The logical to physical manager 306 may be an application specific integrated circuit, (ASIC), processor or other computational apparatus or circuit. The logical to physical manager 306 is connected to each of the fast memory 304 and the slow memory 306, through a bus or other connection, to allow for transfer of data. The logical to physical manager 306 may dynamically change size X.

Figure 4:
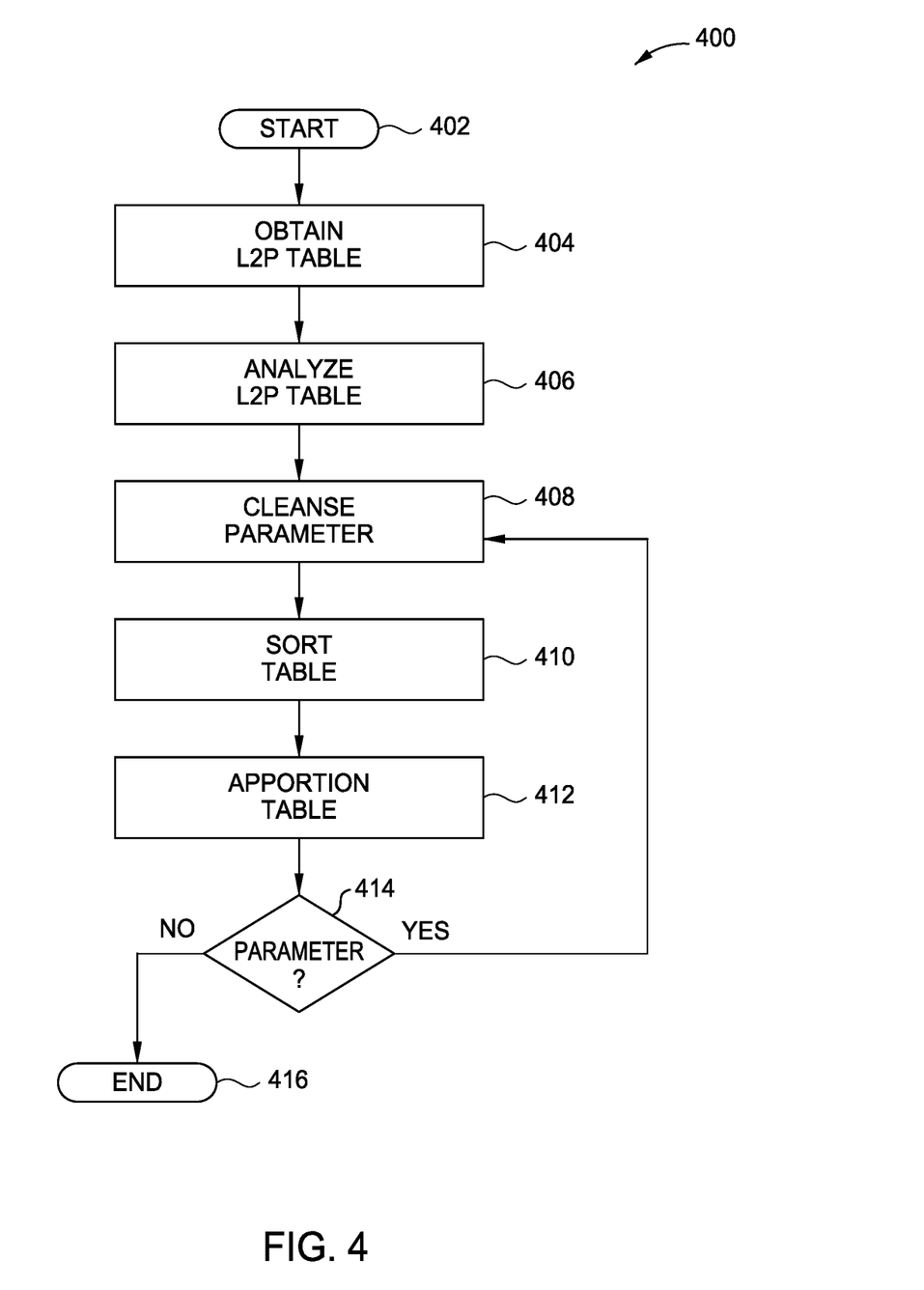
FIG. 4 is a method diagram of allocating a size to a dynamic logical to physical table according to a chosen parameter.

Referring to FIG. 4, a method 400 for allocating a dynamic logical to physical table is disclosed. The method 400 starts at 402. The method proceeds to 404, where a logical to physical table is obtained. The logical to physical table may be present in a host computer, a memory arrangement, such as a solid state drive, a cell phone, a video game or other arrangement. At 406, data is analyzed in the logical to physical table. At 408, a parameter may be chosen for sorting the logical to physical table. The parameter may be those discussed above, such as data that is frequently used in computer operations. Thresholds may be established such that if a portion of data is not used for over six (6) months, the data is long term and is accordingly designated.

At 410, the logical to physical table is sorted according to the parameter chosen in 408. The sorting may be performed according to the type and amount of input output workload for a namespace, whether or not the namespace is active or not, the size of the namespace or the amount of power permitted per device.

At 412, the logical to physical table is apportioned according to the parameter chosen, wherein a portion of the logical to physical table is placed in the L1 section (fast memory) and the remaining portion is placed in the L2 section (slow memory).

After apportioning at 412, a query may be run at 414 to determine if another parameter may be used to reapportion the logical to physical table in 412. Thus, a single or multiple parameters may be used to determine the respective sizes of the L1 and L2 portions. If the query at 414 is a yes, then the method loops to 408 wherein a second parameter may be chosen for apportioning the L1 and L2 portions. If the query at 414 is no, then the method ends at 416.

Figure 5:
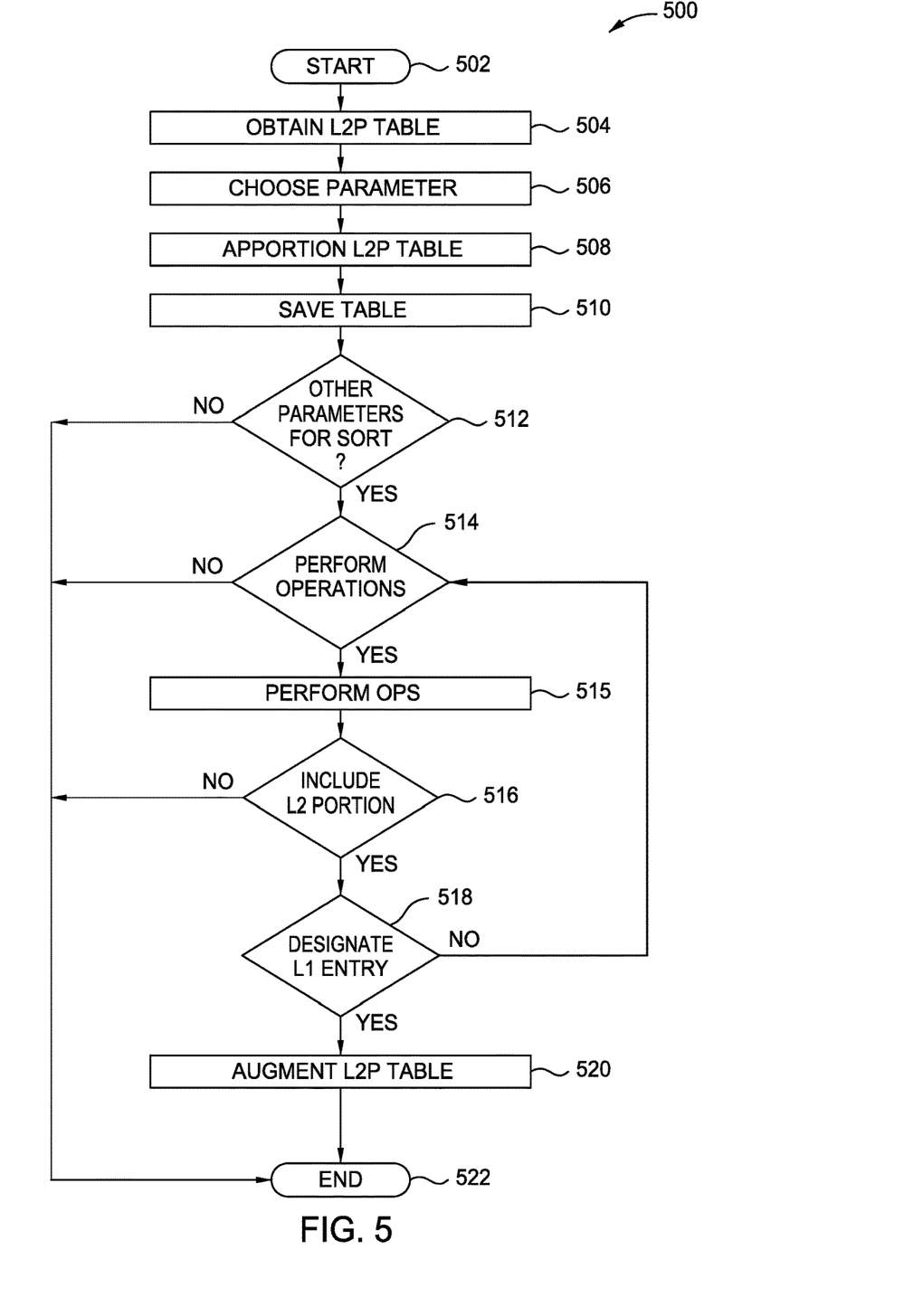
FIG. 5 is a method diagram for allocating a size to a dynamic logical to physical table according to a chosen parameter.

Referring to FIG. 5, a method 500 for allocating a size to a dynamic logical to physical table according to a chosen parameter is disclosed. The method starts at 502. At 504, a logical to physical table is obtained. As in previous embodiments, the logical to physical table maps the logical entity to physical entity. The method proceeds to 506, wherein a user or the system may choose a parameter to determine a first portion L1 and a second portion L2 of the logical to physical table. The method proceeds to 508 wherein to logical to physical table is apportioned based upon the characteristic/parameter used in 506. The method then proceeds to 510, wherein the table is saved. The saving may be done in both volatile and non-volatile memory. A duplicate table may also be saved in non-volatile memory for retrieval at other times. The method proceeds to query 512 wherein it is determined if any other parameters may be used for sorting of the logical to physical table.

The method then proceeds to 514 to query if any operations are to be performed. If no operations are to be performed, then the method ends at 522. If operations are to be performed, then the method proceeds to 515 wherein at least one operation is performed.

The method proceeds to a query at 516 to determine if any of the operations performed at 515 include a L2 portion of the logical to physical table. If none of the operations use the L2 portion of the logical to physical table, then the method may loop back to query 514. If an L2 portion is used in 516, then a query may be run at 518 to determine if the logical to physical L2 entry is to be designated as an L1 entry. If it is desired that no alterations be performed to the L1 and L2 portions of the logical to physical table, then the method may loop back to step 514. If it is desired to provide a continually updated L1 portion, then the method continues from 518 to 520 wherein the logical to physical table is augmented such that the specific data that was in L2 is designated as L1. The logical to physical table may then be saved, if desired. In embodiments, the first portion may be used as a cache which can hold entries from the L2 table.

By providing a system and method to improve input output command latency by dynamic size logical to physical caching improved functionality may be achieved for a computer while minimizing the amount of fast acting computer memory incorporated into the architecture.

In one non-limiting embodiment, a method for operating an apparatus is disclosed comprising: obtaining a logical to physical table for the apparatus, the logical to physical mapping logical entities to physical entities, analyzing data in the logical to physical table, choosing a parameter to determine a first portion and a second portion of a dynamic logical to physical table, sorting the logical to physical table according to the chosen parameter and apportioning a size of the first portion and the second portion of the dynamic logical to physical table based on the parameter.

In another non-limiting embodiment, the method may be accomplished wherein the first portion of the logical to physical table is placed in a fast memory.

In another non-limiting embodiment, the method may be accomplished wherein the fast memory is a volatile memory.

In another non-limiting embodiment, the method may be accomplished wherein the second portion of the logical to physical table is placed in a slow memory.

In another non-limiting embodiment, the method may be accomplished wherein the slow memory is a DDR memory.

In another non-limiting embodiment, the method may be accomplished wherein the slow memory is a NAND flash memory.

In another non-limiting embodiment, the method may be accomplished wherein the parameter is a namespace.

In another non-limiting embodiment, the method may further comprise saving the first portion to a fast memory and saving the second portion to a slow memory.

In another non-limiting embodiment, an arrangement for augmenting a logical to physical table is disclosed comprising means for analyzing data in the logical to physical table, means for choosing a parameter to determine a first portion and a second portion of a dynamic logical to physical table, means for sorting the logical to physical table according to the chosen parameter and means for apportioning a size of the first portion and the second portion of the dynamic logical to physical table based on the parameter.

In another non-limiting embodiment, the arrangement may further comprise means for saving the first portion to a fast memory and saving the second portion to a slow memory.

In another non-limiting embodiment, a method for operating an apparatus is disclosed comprising obtaining a logical to physical table, choosing a parameter to determine a first portion and a second portion of the logical to physical table, apportioning the first portion and the second portion of the logical to physical table based upon the chosen parameter, performing operations based upon the logical to physical table, determining if the performed operations with the logical to physical table include the second portion of the logical to physical table and augmenting the logical to physical table, wherein data in the second portion of the logical to physical table used in operations are placed in the first portion of the logical to physical table.

In another non-limiting embodiment, the method may further comprise saving the logical to physical table after the apportioning the first portion and the second portion of the logical to physical table based upon the chosen parameter.

In another non-limiting embodiment, the method may further comprise saving the logical to physical table after the augmenting the logical to physical table, wherein data in the second portion of the logical to physical table used in operations are placed in the first portion of the logical to physical table.

In a still further embodiment, the method may be performed wherein the first portion of the dynamic logical to physical table is placed in a fast memory.

In another non-limiting embodiment, the method may be performed wherein the fast memory is a volatile memory.

In another non-limiting embodiment, the method may be performed wherein the second portion of the logical to physical table is placed in a slow memory.

In another non-limiting embodiment, the method may be performed wherein the slow memory is a DDR memory.

In another non-limiting embodiment, the method may be performed wherein the slow memory is a NAND flash memory.

In another non-limiting embodiment, the method may be performed wherein the parameter is a namespace.

In another non-limiting embodiment, the method may be performed wherein the characteristic is a type and amount of input output workload for a namespace.

In another non-limiting embodiment, the method may be performed wherein an algorithm is used to determine an amount of first portion capacity and a second portion capacity.

In another non-limiting embodiment, an arrangement for augmenting a logical to physical table is disclosed comprising means for choosing a parameter to determine a first portion and a second portion of the logical to physical table, means for apportioning the first portion and the second portion of the logical to physical table based upon the chosen parameter, means for performing operations based upon the logical to physical table, means for determining if the performed operations with the logical to physical table include the second portion of the logical to physical table; and means for augmenting the logical to physical table, wherein data in the second portion of the logical to physical table used in operations are placed in the first portion of the logical to physical table.

In a further non-limiting embodiment, the arrangement may further comprise means for saving the logical to physical table after the augmenting the logical to physical table, wherein data in the second portion of the logical to physical table used in operations are placed in the first portion of the logical to physical table.

In a further non-limiting embodiment, a method is disclosed for operating a solid state drive, comprising obtaining a logical to physical table, the logical to physical table tabulating locations of data stored on the solid state drive, choosing a parameter to divide the logical to physical table into at least a first portion and a second portion, dividing the logical to physical table into the first portion and the second portion based upon the chosen parameter and storing the first portion of the logical to physical table in a first memory and the second portion of the logical to physical table in a second memory.

In another non-limiting embodiment, the method may be accomplished wherein the first memory is a volatile memory and the second memory is a non-volatile memory.

While the foregoing is directed to embodiments of the present disclosure, other and further embodiments of the disclosure may be devised without departing from the basic scope thereof, and the scope thereof is determined by the claims that follow.

What is claimed is:

1. A method for operating an apparatus, comprising:
obtaining a logical to physical table for the apparatus, the logical to physical mapping logical entities to physical entities;
analyzing data in the logical to physical table;
choosing a parameter to determine a first portion and a second portion of a dynamic logical to physical table;
sorting the logical to physical table according to the chosen parameter; and
apportioning a size of the first portion and the second portion of the dynamic logical to physical table based on the parameter.

2. The method according to claim 1, wherein the first portion of the logical to physical table is placed in a fast memory.

3. The method according to claim 2, wherein the fast memory is a volatile memory.

4. The method according to claim 1, wherein the second portion of the logical to physical table is placed in a slow memory.

5. The method according to claim 4, wherein the slow memory is a DDR memory.

6. The method according to claim 4, wherein the slow memory is a NAND flash memory.

7. The method according to claim 1, wherein the parameter is a namespace.

8. The method according to claim 1, further comprising:
saving the first portion to a fast memory and saving the second portion to a slow memory.

9. An arrangement for augmenting a logical to physical table, comprising:
means for analyzing data in the logical to physical table;
means for choosing a parameter to determine a first portion and a second portion of a dynamic logical to physical table;
means for sorting the logical to physical table according to the chosen parameter; and
means for apportioning a size of the first portion and the second portion of the dynamic logical to physical table based on the parameter.

10. The arrangement according to claim 9, further comprising:
means for saving the first portion to a fast memory and saving the second portion to a slow memory.

11. A method for operating an apparatus, comprising:
obtaining a logical to physical table;
choosing a parameter to determine a first portion and a second portion of the logical to physical table;
apportioning the first portion and the second portion of the logical to physical table based upon the chosen parameter;
performing operations based upon the logical to physical table;
determining if the performed operations with the logical to physical table include the second portion of the logical to physical table; and
augmenting the logical to physical table, wherein data in the second portion of the logical to physical table used in operations are placed in the first portion of the logical to physical table.

12. The method according to claim 11, further comprising:
saving the logical to physical table after the apportioning the first portion and the second portion of the logical to physical table based upon the chosen parameter.

13. The method according to claim 11, further comprising:
saving the logical to physical table after the augmenting the logical to physical table, wherein data in the second portion of the logical to physical table used in operations are placed in the first portion of the logical to physical table.

14. The method according to claim 11, wherein the first portion of the logical to physical table is placed in a fast memory.

15. The method according to claim 14, wherein the fast memory is a volatile memory.

16. The method according to claim 11, wherein the second portion of the logical to physical table is placed in a slow memory.

17. The method according to claim 16, wherein the slow memory is a DDR memory.

18. The method according to claim 16, wherein the slow memory is a NAND flash memory.

19. The method according to claim 11, wherein the parameter is a namespace.

20. The method according to claim 11, wherein the parameter is a type and amount of input output workload for a namespace.

21. The method according to claim 20, wherein an algorithm is used to determine an amount of first portion capacity and a second portion capacity.

22. An arrangement for augmenting a logical to physical table, comprising:
means for choosing a parameter to determine a first portion and a second portion of the logical to physical table;
means for apportioning the first portion and the second portion of the logical to physical table based upon the chosen parameter;
means for performing operations based upon the logical to physical table;

means for determining if the performed operations with the logical to physical table include the second portion of the logical to physical table; and means for augmenting the logical to physical table, wherein data in the second portion of the logical to physical table used in operations are placed in the first portion of the logical to physical table.

23. The arrangement according to claim 22, further comprising:

means for saving the logical to physical table after the augmenting the logical to physical table, wherein data in the second portion of the logical to physical table used in operations are placed in the first portion of the logical to physical table.

24. A method for operating a solid state drive, comprising:

obtaining a logical to physical table, the logical to physical table tabulating locations of data stored on the solid state drive;

choosing a parameter to divide the logical to physical table into at least a first portion and a second portion;

dividing the logical to physical table into the first portion and the second portion based upon the chosen parameter; and storing the first portion of the logical to physical table in a first memory and the second portion of the logical to physical table in a second memory.

25. The method according to claim 24, wherein the first memory is a volatile memory and the second memory is a non-volatile memory.

26. The method according to claim 24, wherein the parameter is used by an algorithm for the dividing the logical to physical table.

* * * * *